United States Patent [19]
Machmerth et al.

[11] 4,328,711
[45] May 11, 1982

[54] REDUCTION GEAR

[75] Inventors: Herbert Machmerth, Solms; Georg Mann, Staufenberg; Gerhard Salzmann, Solms, all of Fed. Rep. of Germany

[73] Assignee: Ernst Leitz Wetzlar GmbH, Wetzlar, Fed. Rep. of Germany

[21] Appl. No.: 100,114

[22] Filed: Dec. 4, 1979

[30] Foreign Application Priority Data

Dec. 5, 1978 [DE] Fed. Rep. of Germany ....... 2852493

[51] Int. Cl.³ ............................................. F16H 15/10
[52] U.S. Cl. ....................................... 74/194; 74/199; 74/209; 192/54
[58] Field of Search ................. 74/194, 199, 208, 209, 74/411, 422; 242/71, 71.4, 71.5; 192/54 X, 56 R

[56] References Cited
U.S. PATENT DOCUMENTS

| | | | |
|---|---|---|---|
| 2,398,133 | 4/1946 | Cronholm | 242/71.5 |
| 2,749,764 | 6/1956 | Chou | 74/194 X |
| 3,527,112 | 9/1970 | Korell | 74/209 X |
| 3,762,291 | 10/1973 | Kimura et al. | 242/71.5 X |
| 3,840,884 | 10/1974 | Umeda | 242/71.5 X |
| 3,875,814 | 4/1975 | Stever | 74/194 |
| 3,972,248 | 8/1976 | Adams | 74/422 X |
| 4,047,442 | 9/1977 | Pammer et al. | 74/194 |
| 4,047,447 | 9/1977 | Culver et al. | 74/411 X |
| 4,265,347 | 5/1981 | Dischler | 192/54 X |

FOREIGN PATENT DOCUMENTS

| | | | |
|---|---|---|---|
| 55-20971 | 2/1980 | Japan | 74/194 |
| 1397762 | 6/1975 | United Kingdom | 74/194 |

OTHER PUBLICATIONS

"Feinmechanische Bavelemente", VEB Verlag Technik, Berlin, 3rd. ed., 1975, pp. 510-518.

Primary Examiner—Kenneth Dorner
Assistant Examiner—Charles M. Wall
Attorney, Agent, or Firm—Schwartz, Jeffery, Schwaab, Mack, Blumenthal & Koch

[57] ABSTRACT

Disclosed is a reduction gear assembly for automatically accommodating varying load conditions on a driven member, comprising a rotatably mounted, axially displaceable first shaft; a drive engagement driving the first shaft by a frictional force engaging in the axial direction of the shaft; a driving element mounted for rotation with the first shaft; and a driven member rotatably driven by the driving element and being subjected to varying load conditions, wherein the driving element comprises means for controlling the axial movement of the first shaft in response to the varying load conditions on the driven member. Also disclosed is a camera embodying the reducing gear assembly as part of an automatic film advance system.

11 Claims, 1 Drawing Figure

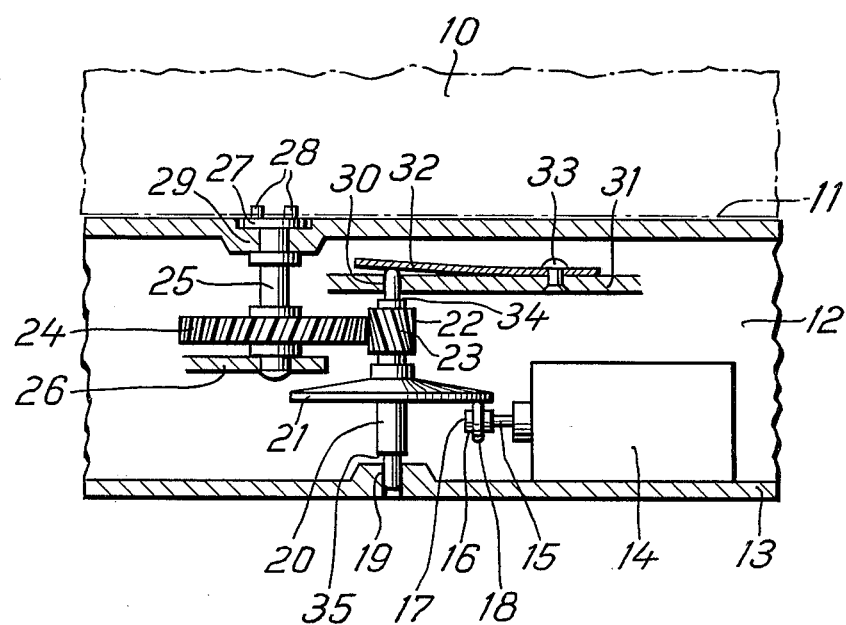

REDUCTION GEAR

BACKGROUND OF THE INVENTION

The present invention relates to a reduction gear for varying loads and more particularly to a reduction gear having shafts which include an angle between them. At least one of said shafts is under the action of a spring force and is supported in an axially displaceable manner. Also included are means drivingly connecting the two shafts, with at least one of these means being elastically deformable, and transmission means mounted on the axially displaceable shaft operatively connecting the shaft with a drive which is under a varying load.

Reduction gears of this type are known as so-called friction gear drives, and in these the motion and the force are transmitted by the friction of drivingly connected means, such as that of an elastically deformable rotating or friction body, on a flat disk. Such friction gear drives differ from spur gears by their simple construction and by operating with a low noise level. In general, the disadvantages of the former are reduced efficiency and high contact pressures required between the driving parts connected by friction, in order to prevent slipping. For this reason, when designing friction gear drives of this type, the force to be transmitted is usually increased by the factor of the so-called slippage margin, which in turn raises the contact pressure and requires high axle pressures with corresponding bearings.

SUMMARY OF THE INVENTION

Accordingly, it is an object of the present invention to provide an improved reduction gear.

It is a further object of the invention to provide an improved reduction gear wherein the contact pressure is adapted to the load moment acting on the driven member, whereby the slippage margin which must be taken into account in the design of the drive may be reduced and the power requirements diminished and thus its efficiency increased.

Another object of the invention resides in the provision of an improved film winding system for a camera.

In accomplishing the foregoing objects, there has been provided in accordance with the present invention a reduction gear assembly for automatically accommodating varying load conditions on a driven member, comprising a rotatably mounted, axially displaceable first shaft; means for rotatably driving the first shaft by a frictional force engaging in the axial direction of the first shaft; a driving element mounted for rotation with the first shaft; and a driven member rotatably driven by the driving element and being subjected to varying load conditions. The driving element comprises means for controlling the axial movement of the first shaft in response to the varying load conditions on the driven member. Preferably, the means for rotatably driving the first shaft comprises a second rotatable shaft positioned at an angle with respect to the first shaft, means for rotatably driving the second shaft, a first drive member attached for rotation to the first shaft and a second drive member attached for rotation with the second shaft and being engaged with the first drive member, and at least one of the first and second drive members is elastically deformable. The assembly preferably further comprises means for normally biasing the first shaft in the direction urging the first and second drive members into engagement.

In accordance with another aspect of the invention, there has been provided a camera, comprising an automatic film transporting mechanism including a motor, a driven element for carrying a film spool and a reduction gear assembly for driving the driven element from the motor, and the reduction gear assembly comprises the reduction gear assembly defined above.

Further objects, features and advantages of the present invention will become apparent to the skilled artisan from the detailed description of preferred embodiments which follows, when considered together with the accompanying figure of drawing.

BRIEF DESCRIPTION OF THE DRAWING

The FIGURE of drawing illustrates a portion of a camera body in cross-section including a reduction gear according to the present invention forming a part of a motor drive mechanism for the camera.

DETAILED DESCRIPTION OF PREFERRED EMBODIMENTS

According to the invention, there is connected with the axially displaceably supported shaft, as the means of transmission, a driven element controlling the axial motion of said shaft as a function of the load. In this manner, the load applied generates a reactive force acting on the driven element which in turn establishes a corresponding load-dependent frictional contact between the drive gear parts joined by friction. This has the result that the work expended in rotating the corresponding, elastically deformable gear part is also adapted to the prevailing load, and a nearly optimum power efficiency is attained.

The elastic deformability of one of the drivingly connected elements leads to a very low noise operation of the reduction gear, even when the element is connected directly with a high velocity drive shaft of a motor.

The drivingly connected means encompass advantageously a driven disk and a rotating body cooperating with said driven disk, wherein either the rotating body or the driven disk, or both, may be elastically deformable. In the simplest case, if the rotating body is in the form of a disk, it is sufficient to provide a ring made of an elastic material, such as rubber, mounted on said disk. Under certain conditions it may, however, be more convenient for reasons of manufacturing technology to make the rotating body of a hard material and to form as elastic the surface upon which said body acts.

According to a particular characteristic of the invention, advantageously a pinion with helical teeth may be mounted on the axially displaceable shaft as the driven element. In this embodiment, an axial force having the angle of inclination of the gear teeth as the parameter and having the load moment applied as the variable, establishes the corresponding load-dependent frictional contact between the rotating body and the driven disk. Advantageously, the rotating body may be positioned at different distances with respect to the axis of the axially displaceable shaft. Thereby, the reduction ratio may be varied in a manner known per se. In the case of micromotors, it is sufficient to displace this rotating body in the direction of the shaft.

The reduction gear according to the invention is suitable, for example, for use in a film winding device of a photographic camera, wherein the driving force of a high velocity micromotor is transmitted by means of this drive gear and serves to transport the film and set the shutter. The very rapid transport of the film, each time by the length of an image, and the setting of the shutter (up to several times a second) in the case of using spur gears in combination with a high speed motor, results in operating frequencies having disagreeable noises, which are particularly disturbing in the case of news reporting or photographing animals. Worm gears operate with less noise, but also with substantially reduced efficiency, which in the case of battery operated electric motors leads to the known difficulties.

The reduction gear according to the invention is at least equivalent in its low noise level operation to a similar worm gearing, but attains a degree of efficiency which very nearly corresponds to that of spur gearing. Furthermore, it has been found that, because of minimal slippage, use of the reduction gear in combination with a motor drive for a camera allows attainment of several film transport and shutter setting cycles per second. Further details of the invention may be seen in the drawing and shall be explained more thoroughly hereinafter.

Referring now to the drawing, the arrangement according to the figure comprises an indicated photograhic camera 10 with a bottom part 11, to which a housing 12 is attached and is secured in any convenient manner. A micromotor 14 is arranged on a bottom plate 13 of the housing 12, the micromotor having a drive shaft 15 and being powered by a battery, not shown. A rotating body 16 is mounted on the end of the drive shaft 15 facing away from the micromotor 14. It is in the form of a disk 17 having an O-ring 18 made of an elastic material mounted on it. The disk 17 may consist of a V belt pulley or the like. In a bearing 19 in the bottom plate 13 of the housing 12, a shaft 20 is supported in an axially displaceable manner, this shaft being at right angles to the drive shaft 15 of the micromotor 14. A driven disk 21 is mounted on the shaft 20 so that its flat edge surface on the bottom side is engaged by the O-ring 18, thus establishing a driving contact between the rotating body 16 (and therefore with the drive shaft 15 of the micromotor 14) and the driven disk 21 of the shaft 20. A pinion 22 with helical teeth 23 is fixedly arranged on the shaft 20 above the driven disk 21, engaging a spur gear 24 which also is provided with helical gear teeth. The spur gear 24 is mounted on a driven shaft 25 supported at its lower end in a plate 26 stationarily attached to the housing. The upper end of the driven shaft 25 is fixedly connected with a coupling disk 27 which carries coupling projections 28 and is supported rotatably in a bowl like depression 29 of the cover plate of the housing 12.

The axially displaceable shaft 20 is held at its upper end in a circular recess of a crosspiece 31 stationarily attached to the housing and is axially biased by a spring 32. The spring 32 is mounted by means of a screw 33 on the crosspiece 31. To limit the axial shifting of the shaft 20, upper and lower stops 34, 35 are provided on it.

Following the start of the micromotor 14, its driving force is transmitted by way of the drive shaft 15 and the rotating body 16 to the driven disk 21, and thus to the shaft 20, by means of the O-ring 18, whereby a frictional driving contact between the bottom surface of the driven disk 21 and the O-ring 18 is constantly maintained by means of the biasing of the shaft 20 by the spring 32. The shaft 20 transmits the driving force and motion by means of the pinion 22 to the spur gear 24, and the driven shaft 25 drives a dynamic load through the coupling projections 28, for example, a winding reel, not shown, of the photographic camera 10. It also sets the shutter of the camera.

Any change in the load moment applied to the coupling projections 28 is transmitted by way of the driven shaft 25 and the spur gear 24 to the pinion 22. Because of the helical gear teething 23 of the pinion 22, there results a reactive force acting upon the pinion 22, and depending on the load moment applied, the variable force is axially directed as a parameter onto the flanks of the helical teeth 23 corresponding to the angle of inclination of the helical teeth. As the result, the shaft 20 and thus the driven disk 21 are axially displaced, whereby the contact pressure between the driven disk 21 and the O-ring 18 is changed with the elastic deformation of the latter, and correspondingly a higher or lesser frictional contact pressure is obtained, depending on the conditions of the load. It is obvious that, in place of the frictionally effective O-ring, the bottom side of the driven disk 21 may be made elastically deformable and be provided with an equally frictionally effective covering, while the rotating body 16 may consist of a hard material.

Depending on the distance maintained by the rotating body 16 in relation to the axis of the shaft 20, the reduction ratio of the drive is variable. This may be effected, for example, by shifting the micromotor 14 on the bottom plate 13 of the housing 12 by means of a slide (not shown), accessible from the outside. This shifting may be done continuously or in predefined steps. The displacement of the rotating body 16 beyond the axis of the shaft 20 may be used for the reversal of the direction of rotation.

The embodiment represented hereinabove, as mentioned before, is merely an exemplary embodiment of the invention, and the invention is not to be restricted to it. Numerous other embodiments are possible. Thus, for example, it is conceivable to arrange the O-ring in frictional contact on a lateral, inclined surface of the driven disk. The shape of the rotating body may also be different; it may have, for example, the configuration of a roll or a truncated cone.

What is claimed is:

1. A reduction gear assembly for automatically accommodating varying torsional load conditions on a driven member, comprising:

a rotatably mounted, axially displaceable first shaft;

means for rotatably driving said first shaft by a frictional force engaging in the axial direction of said first shaft, said means comprising a second rotatable shaft positioned at an angle with respect to said first shaft, means for rotatably driving said second shaft, a first driven member attached for rotation to said first shaft and a second driven member attached for rotation with said second shaft and being engaged with said first driven member, at least one of said first and second drive members being elastically deformable;

a driving element mounted for rotation with said first shaft; and a driven member rotatably driven by said driving element and being subjected to varying load conditions, said driving element comprising means for axially moving said first shaft to automatically increase and decrease said frictional force in response to an increase or decrease, respectively, in the torsional load conditions on said driven member.

2. A reduction gear assembly according to claim 1, further comprising means for normally biasing said first shaft in the direction urging said first and second drive members into engagement.

3. A reduction gear assembly according to claim 2, wherein said first drive member comprises a disk and said second drive member comprises an elastically deformable portion for engagement with said disk.

4. A reduction gear assembly according to claim 2 or 3, wherein said first drive member comprises a disk which is at least over a portion of the surface thereof elastically deformable.

5. A reduction gear assembly according to claim 3, wherein said second drive member comprises an O-ring of elastic material.

6. A reduction gear assembly according to claim 1, or 2, wherein said driving element comprises a pinion having helical gear teething.

7. A reduction gear assembly according to claim 6, wherein said driven member comprises a gear having helical gear teething matching the gear teething of said driving element.

8. A camera, comprising an automatic film transporting mechanism including a motor, a driven element for carrying a film spool and a reduction gear assembly for driving said driven element from said motor, said reduction gear assembly comprising the reduction gear assembly defined by claim 1.

9. A reduction gear assembly for automatically accommodating varying torsional load conditions on a driven member, comprising:

a rotatably mounted, axially displaceable first shaft;

means for rotatably driving said first shaft, said driving means comprising a second rotatable shaft positioned at an angle with respect to said first shaft, means for rotatably driving said second shaft, a first drive member attached for rotation to said first shaft and a second drive member attached for rotation with said second shaft and being engaged with said first drive member, wherein at least one of said first and second drive members is elastically deformable, to produce a frictional driving force engaging in the axial direction of said first shaft;

a driving element mounted for rotation with said first shaft at a position axially removed from said first drive member; and a driven member rotatably driven by said driving element and being subjected to varying torsional load conditions, said driving element comprising means for axially moving said first shaft to automatically increase and decrease said frictional driving force in direct proportional response to the varying torsional load conditions on said driven member.

10. A reduction gear assembly as defined in claim 1, wherein said driving element is mounted on said first shaft.

11. A camera, comprising an automatic film transporting mechanism including a motor, a driven element for carrying a film spool and a reduction gear assembly for driving said driven element from said motor, said reduction gear assembly comprising:

a rotatably mounted, axially displaceable first shaft;

means for rotatably driving said first shaft, said means comprising a first drive member attached for rotation to said first shaft and a second drive member rotatably driven by said motor and being engaged with said first drive member, wherein at least one of said first and second drive members is elastically deformable, to produce a frictional driving force engaging in the axial direction of said first shaft;

a driving element mounted for rotation with said first shaft; and means for normally biasing said first shaft in a direction urging said first and second drive member into engagement;

said driven element being rotatably driven by said driving element and being subjected to varying torsional load conditions when a film spool is carried thereon, and said driving element comprising means for axially moving said first shaft to automatically increase and decrease said frictional driving force in direct proportional response to the varying torsional load conditions on said driven element.

* * * * *